(12) United States Patent
Smolders et al.

(10) Patent No.: US 6,336,191 B1
(45) Date of Patent: Jan. 1, 2002

(54) METHOD AND SYSTEM FOR CLOCK COMPENSATION IN INSTRUCTION LEVEL TRACING IN A SYMMETRICAL MULTI-PROCESSING SYSTEM

(75) Inventors: Luc Rene Smolders; Bruce Gerald Mealey, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/264,646

(22) Filed: Mar. 8, 1999

(51) Int. Cl.[7] ................................................. G06F 1/04
(52) U.S. Cl. ...................................... 713/501; 712/227
(58) Field of Search ................................ 713/501, 503; 714/38; 712/200–219, 227

(56) References Cited

U.S. PATENT DOCUMENTS

| | | |
|---|---|---|
| 5,564,028 A | 10/1996 | Swoboda et al. |
| 5,594,864 A | 1/1997 | Trauben |
| 5,621,886 A | 4/1997 | Alpert et al. |
| 5,630,102 A | 5/1997 | Johnson et al. |
| 5,642,479 A | 6/1997 | Flynn |
| 5,717,881 A | 2/1998 | Beard et al. |
| 5,724,566 A | 3/1998 | Swoboda et al. |
| 5,740,414 A | 4/1998 | Tovey et al. |
| 6,035,422 A * | 3/2000 | Hohl et al. ............... 714/35 |
| 6,230,263 B1 * | 5/2001 | Ryan et al. ............... 712/245 |

* cited by examiner

Primary Examiner—Thomas M. Heckler
(74) Attorney, Agent, or Firm—Volel Emile; Bracewell & Patterson L.L.P.

(57) ABSTRACT

A method and system within a symmetrical multi-processing system or information handling system are disclosed for compensating all the processor clocks when performing instruction level tracing. The method provides a simple and flexible mechanism to slow down the clock proportionally to the density of the trace. According to the present invention, the method determines two parameters; a trigger and a compensation step. The trigger is defined as the number of instructions between clock increments and the compensation step is the number of ticks to add to a clock. When the trigger is equal to one, the clock is incremented at each tracing step by an amount equal to the compensation step multiplied by the number of instructions since the last compensation. When the trigger is greater than one, the compensation step is equal to one and the clock is incremented by one every time the number of instructions since the last compensation is bigger than the trigger. The method and system of the present invention links the trigger and compensation step together thereby allowing accurate clock compensation.

29 Claims, 6 Drawing Sheets

METHOD AND SYSTEM FOR CLOCK COMPENSATION IN INSTRUCTION LEVEL TRACING IN A SYMMETRICAL MULTI-PROCESSING SYSTEM

BACKGROUND OF THE INVENTION

1. Technical Field

The present invention relates in general to a method and system for data processing and in particular to an improved method and system for clock compensation in a symmetrical multi-processing system. Still more particularly, the present invention relates to a method and system for clock compensation in a symmetrical multi-processing environment when using instruction level tracing tools.

2. Description of the Related Art

Conventionally, detailed code debugging or analysis in a symmetrical multi-processing system or information handling system can be accomplished by using software-tracing tools. These software tracing tools divert the flow of execution from the regular code to their own code to take the trace. Typically, this usually adds many instructions to the regular path of execution and slows it down considerably, depending on the granularity of the trace.

With the machine executing many more instructions than in regular mode, and the hardware, including the clock, going at regular speed, huge distortions in the trace can be observed, essentially because of the clock interrupt handling code. Therefore, clock "compensation" is necessary in software instruction level tracing tools because they divert the flow of execution from the regular code to their own code to take the trace. Prior art solutions to solve this problem have the clock "compensated" or slowed down while the software-tracing tool is active. However, these solutions do not work very effectively in a symmetrical multi-processor SMP environment where there is no mechanism to force the processor clocks to stay in sync. Another weakness of prior art compensation techniques is the lack of machine speed or workload type related adjustment of the compensation amount that is typically a static value.

Consequently, it would be desirable to provide an improved method and system that compensates all the processor clocks in an SMP environment when using software-instruction level tracing. The subject invention herein solves all of these problems in a new and unique manner that has not been part of the art previously.

SUMMARY OF THE INVENTION

It is therefore one object of the present invention to provide an improved method and system for clock compensation during instruction level tracing.

It is another object of the present invention to provide an improved method and system for clock compensation when using instruction level tracing in a symmetrical multi-processing SMP environment.

It is yet another object of the present invention to provide an improved method and system for linking the machine speed and the type of workload to be traced to the clock compensation amount.

The foregoing objects are achieved as is now described. A method and system within a symmetrical multi-processing system or information handling system are disclosed for compensating all the processor clocks when performing instruction level tracing. The method provides a simple and flexible mechanism to slow down the clock proportionally to the density of the trace. According to the present invention, the method determines two parameters; a trigger and a compensation step. The trigger is defined as the number of instructions in the traced code between clock increments and the compensation step is the number of ticks to add to a clock. When the trigger is equal to one, the clock is incremented at each tracing step by an amount equal to the compensation step multiplied by the number of instructions in the current basic block. When the trigger is greater than one, the compensation step is equal to one and the clock is incremented by one every time the number of instructions since the last compensation is bigger than the trigger. The method and system of the present invention links the trigger and compensation step to the processor speed and the workload to trace thereby allowing accurate clock compensation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
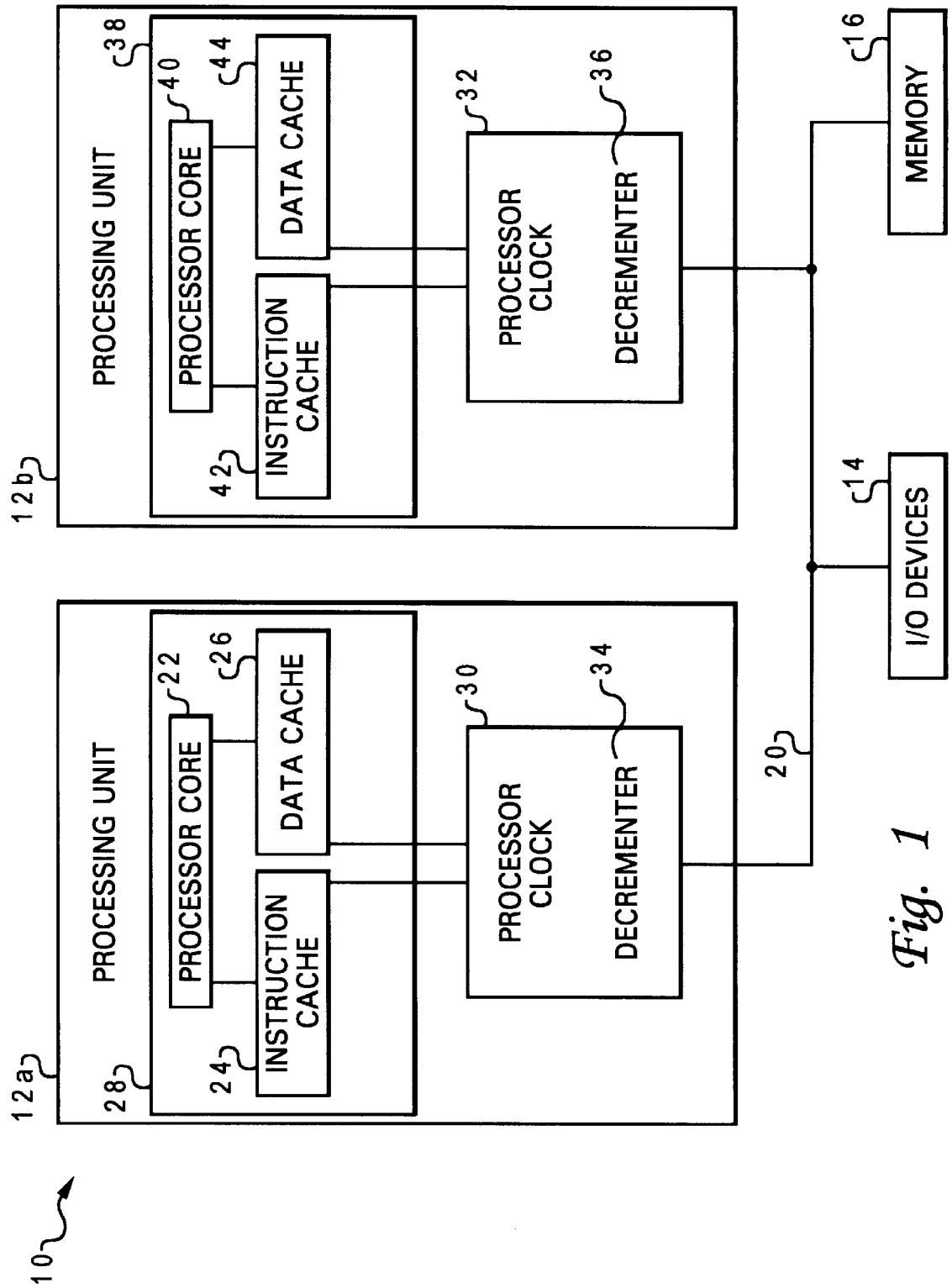
FIG. 1 depicts a high-level block diagram of a symmetrical multi-processing system, which may use the clock compensation method of the present invention.

With reference now to the figures and in particular with reference to FIG. 1, there is illustrated a preferred embodiment of a symmetrical multi-processing SMP system 10 that may be used with the method and system of the present invention. The SMP system comprises multiple integrated circuit pipelined superscalar microprocessors, shown in one example as 12a and 12b in FIG. 1. Accordingly, the multi-processors each include processing cores 28 and 38, instruction caches 24 and 42, and data caches 26 and 44, respectively. The processor cores, 28 and 38, preferably comprise one of the PowerPC™ line of microprocessors available from IBM Microelectronics (e.g., the PowerPC™604), which operate according to reduced instruction set computing (RISC) techniques. Details concerning the architecture and operation of the PowerPC™604 processor may be found in the *PowerPC™604 RISC Microprocessor User's Manual*, which is incorporated herein by reference.

Referring once again to FIG. 1, the processing cores 28 and 38, are connected via a single system bus 20 to I/O devices 14 and memory 16 through processor clocks 30 and 32 and decrementers 34 and 36 for use with the present invention, as will be more fully described below. The processor clocks and decrementers may be implemented utilizing first and second hardware counters. The first counter or processor clock is continuously being incremented and serves as the time reference, and the second counter or decrementer is decremented continuously at the same frequency until it reaches zero, at which point a clock interrupt is generated and the clock interrupt handling code is called to reload this counter. Therefore, the second counter or decrementer represents ticks until the next clock interrupt will be sent to the processor.

In accordance with the method and system of the present invention, two parameters are initially calculated for use in clock compensation, more specifically, a trigger and a compensation step. The method provides a simple mechanism to slow down the clock proportionally to the density of the trace. The trigger is defined as the number of instructions in the traced code between clock increments and the compensation step is the number of ticks to add to a processor clock and to delete from a decrementer. The following parameters must first be determined in order to calculate the compensation amount and are set values used in accordance with the preferred embodiment of the present invention:

P=Processor Speed (in Cycles/Second);
T=Clock Speed (in Ticks/Seconds);
C=CPI (in Cycles/Instructions); and
by making the appropriate substitutions;

Compensation Amount=$(C \times T)/P$ (in Ticks/Instructions).

Figure 2:
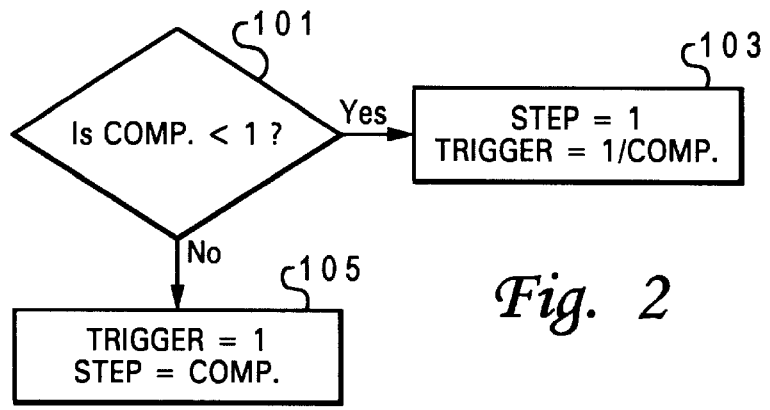
FIG. 2 is a flow diagram depicting the calculation of parameters used in association with the clock compensation method in accordance with the present invention.

Referring now to FIG. 2, there is shown a flowchart for the calculation of the compensation step and the trigger that should be used given the above calculated compensation amount. More specifically, the compensation amount is a fractional number that is broken into a combination of the trigger and compensation step, as will be more fully described below. As shown in block 101, if the compensation amount is less than one, the compensation step is set equal to one and the trigger is one over the compensation amount, as shown in block 103. If however, the compensation amount is greater than 1, the trigger than equals one and the compensation step equals the compensation amount, as shown in block 105

Figure 3:
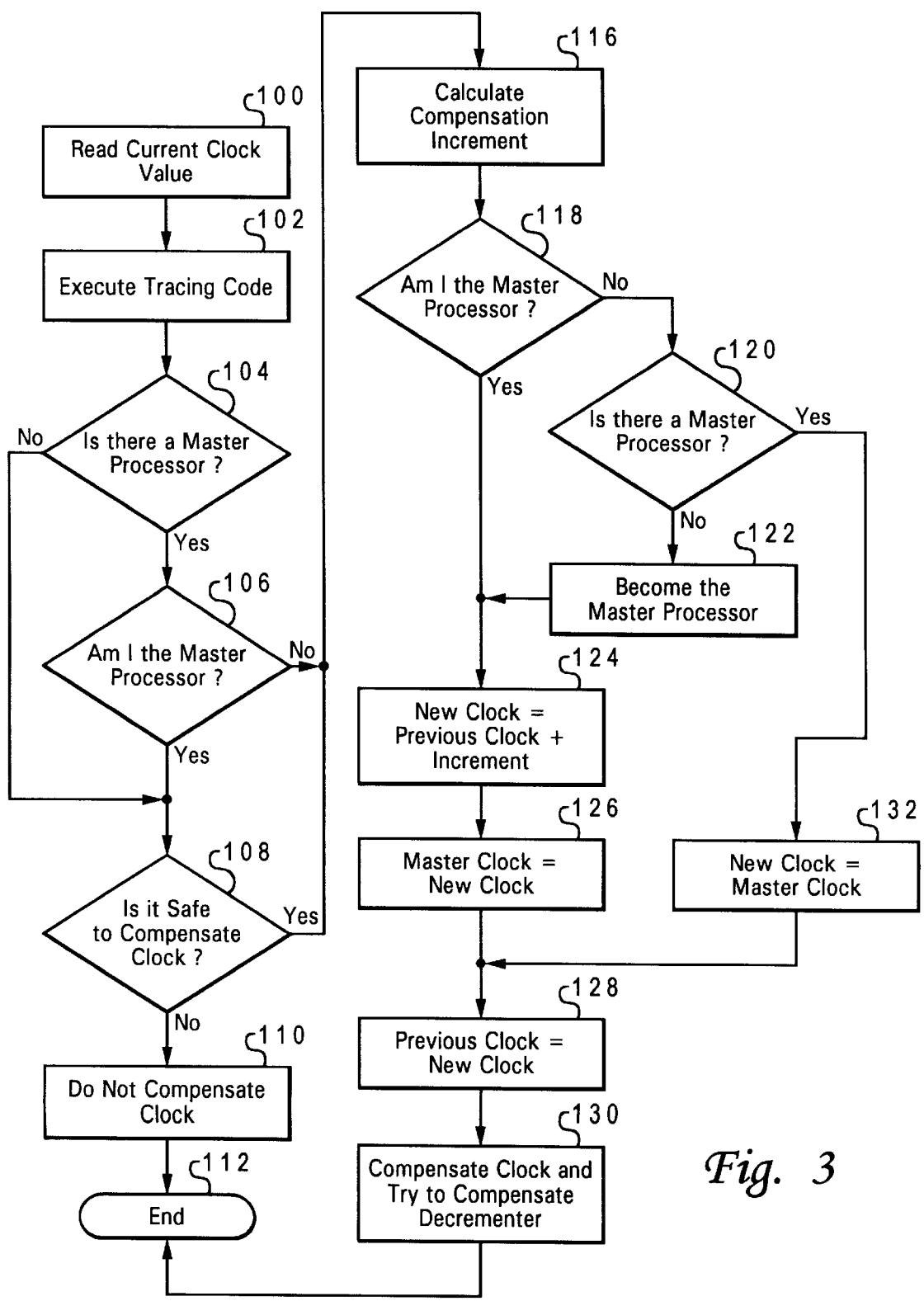
FIG. 3 is a flow diagram depicting the clock compensation method in accordance with the present invention.

Referring now to FIG. 3, there is shown a flow diagram depicting the clock compensation method in accordance with the present invention. The method begins at step 100 wherein a current processor clock value is read, either processor clock 30 or 32 of processing units 12a or 12b for the processing unit which is using instruction level tracing. By way of example, the tracing tool will be used for processing unit 12a utilizing processor clock 30 and decrementer 34. Therefore, reading current clock value at step 100 corresponds to reading the current value of processor clock 30. At this point, the current clock value becomes a fixed value in software designated as the current clock value within the flowcharts of FIGS. 4 and 5. In accordance with the preferred embodiment of the present invention, a second assigned fixed value in software is used for compensating all the processor clocks and is referred to as the master clock value. A master clock value is always a copy of the current clock value of the processor designated as the master, as will be more fully described below. Only one processor fully compensates both its processor clock and associated decrementer independently from the other processors, while all the other processors compensate only their decrementer independently and simply follow the master processor.

Turning once again to FIG. 3, once the tracing code has been executed in step 102, the method of the present invention determines if a master processor has already been assigned after a first execution of the tracing code for the data processing system, as shown in step 104. If there is no master processor or if the processing unit being traced has been designated as the master processor, as shown in step 106, the process proceeds to step 108 to determine if it is safe to compensate the clock 30. A more detailed flow diagram depicting step 108 is shown in FIG. 4.

Figure 4:
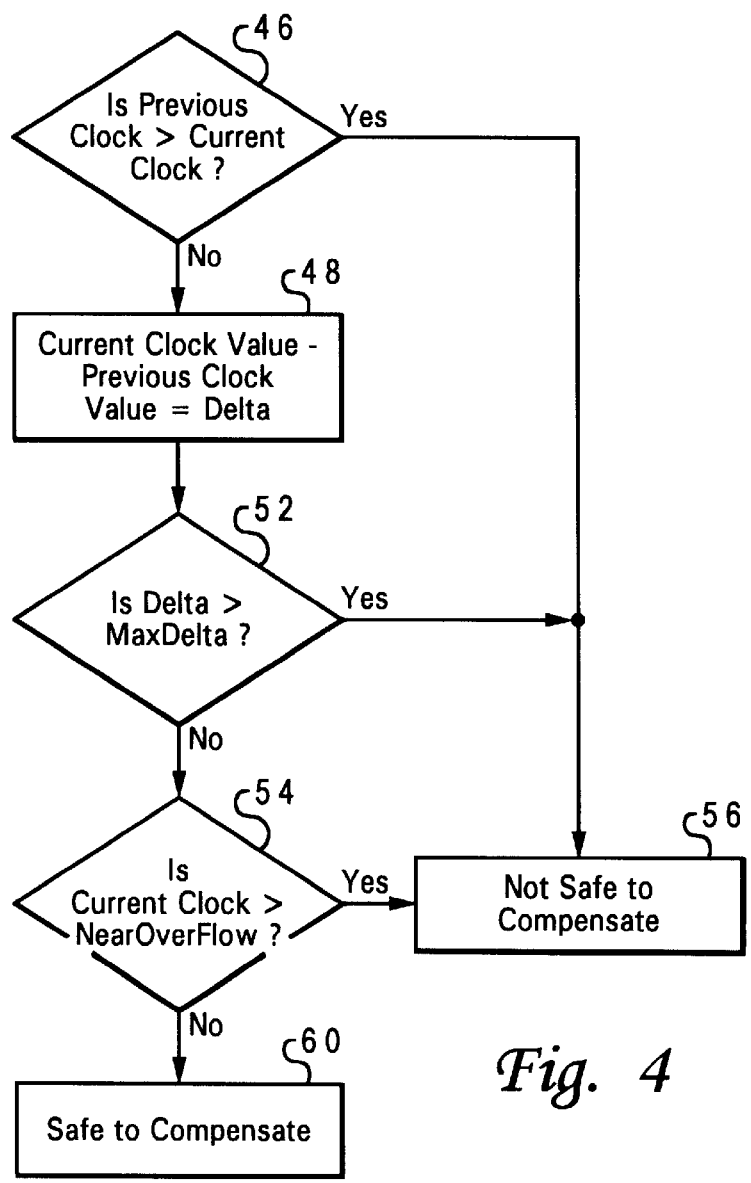
FIG. 4 is a detailed flow diagram depicting the step for determining if clock compensation is safe to perform in FIG. 3.

Referring now to FIG. 4, the flow diagram shown determines when it is not safe to compensate a processor clock and starts by comparing a previous clock value (which would be a value of zero in the case of a first trace interrupt) taken at a previous trace interrupt to see if it is greater than the current clock value, as shown in step 46. The case of when the previous clock value is greater than the current clock value represents a processor clock overflow condition. When a processor clock overflow condition occurs it is not safe to compensate, as shown in step 56, but this occurs very infrequently relative to the frequency of a trace. If the previous clock value is less then than the current clock value a delta value is calculated by subtracting the previous clock value from the current clock value, as shown in step 48. The typical time between executions of the tracing code is well known in the prior art and is less then a max-delta value wherein max-delta is defined as the maximum delta clock ticks allowed between calls of the tracing code. Therefore, as shown in step 52, when the delta value is greater than the max-delta value, a large difference between trace events has occurred. This large difference is assumed to be due to an interval of untraced code. In this case the clock once again is not safe to compensate, as shown in step 56.

Referring once again to FIG. 4, if the delta value is equal or less than the max-delta value, the current clock value is checked in step 54 to see if it is greater than a near overflow value. The near overflow value is defined as the maximum clock value to be compensated. Therefore, if the clock is too close to overflowing it is not safe to compensate, as shown in step 56 because it may overflow before the compensation is applied. If the above three conditions in FIG. 4 result in the clock not being safe to compensate then the process in step 108 of FIG. 3 proceeds to step 110 wherein the clock is not compensated.

Referring once again to FIG. 3, if it is determined in step 106 that another processor (in this example, 12b) has been designated as the master processor, the process proceeds to step 116 to calculate the compensation increment. Additionally, as shown in FIG. 3, if the processing unit 12a has been designated as the master processor in step 108 and in accordance with the logic described above in FIG. 4 it is safe to compensate, the process also proceeds to step 116 to calculate the compensation increment. A more detailed flow diagram depicting step 116 is shown in FIG. 6.

Figure 6:
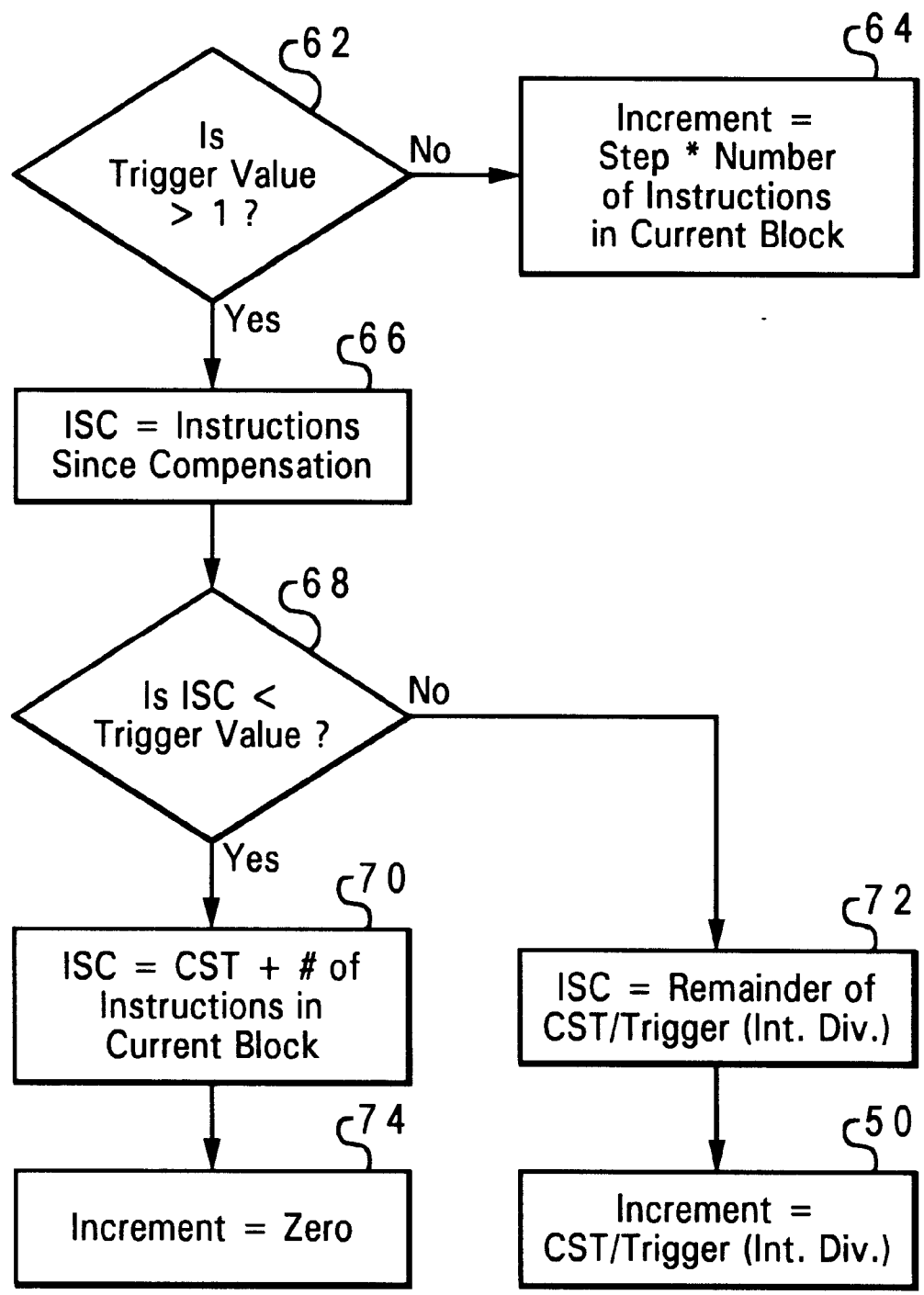
FIG. 6 is a detailed flow diagram depicting the step of calculating the compensation increment in FIG. 3.

Referring now to FIG. 6, there is shown a detailed flow diagram depicting the step of calculating the clock compensation increment in step 116 of FIG. 3. The method of the present invention links the machine speed and the type of workload to be traced to the clock compensation amount. This compensation scheme is based on the assumption that when tracing is activated each instruction or basic block is being traced. Therefore the real time between calls is very nearly just the time spent in the tracing code. In accordance with the present invention and as mentioned before, two parameters are used; the trigger and the compensation step. As described before, the trigger is the number of instructions between clock increments before compensation and the compensation step is the number of ticks to add to the clock and represent in combination the fractional value for the compensation amount. Referring to FIG. 6, if in step 62 the trigger value is equal to one, the increment amount, in step 64 equals the compensation step times the number of instructions in a current block and the process returns to FIG. 3.

However, if the trigger value is greater than one, a value for the instructions since compensation (ISC) is determined in step 66, which equals the number of instructions since the last time the trigger value was reached and the clock was compensated. This ISC value is then checked to see if it is less than the trigger value in step 68. If the ISC value is less than the trigger value the new value for ISC equals its value plus the number of instructions in the current block and the increment is set equal to zero, as shown in steps 70 and 74. If the ISC value is greater or equal than the trigger value, the new ISC and increment amount value are respectively the integer remainder of the ISC value divided by the trigger value and the result of the integer division, as shown in steps 72 and 50. For example, 9/2=4 (9 equaling the number of instructions and 2 equaling the predetermined trigger value) with an integer remainder of 1, the value of the increment equals 4 and the ISC equals 1. The process after completing either step 74 or 50 now has an increment value for compensation and returns to FIG. 3. Good values for the trigger and the compensation step are critical for accurate clock compensation and depend on the machine speed and the workload to be traced. As described above the compensation step and trigger are linked to these two parameters thereby allowing accurate clock compensation.

Turning once again to FIG. 3, the processing unit 12a is once again checked to see if it is the master processor in step 118. If the processing unit 12a is the master processor, then the new clock value equals the previous clock value plus the increment determined in step 116 from FIG. 6, as shown in step 124. The previous clock and master clock values are now set equal to this new clock value and the decrementer and clock are compensated for use next time the tracing code is called, as shown in steps 126, 128 and 130. If the processing unit in step 118 is not designated as the master processor, the process proceeds to step 120 wherein a determination is made if there is already a master processor. If there is no master processor yet, then the case of the first time through the tracing code has occurred for the data processing system and processor 12a is designated as such in step 122 and the process proceeds to step 124, as described above. If there is a master processor and it is not the processing unit 12a, the new clock value is set equal to the master clock value and the previous clock value is set equal to the new clock value, as shown in steps 132 and 128, and the decrementer and clock are compensated in step 130. A more detailed flow diagram depicting step 130 of FIG. 3 is shown in FIG. 7.

Figure 7:
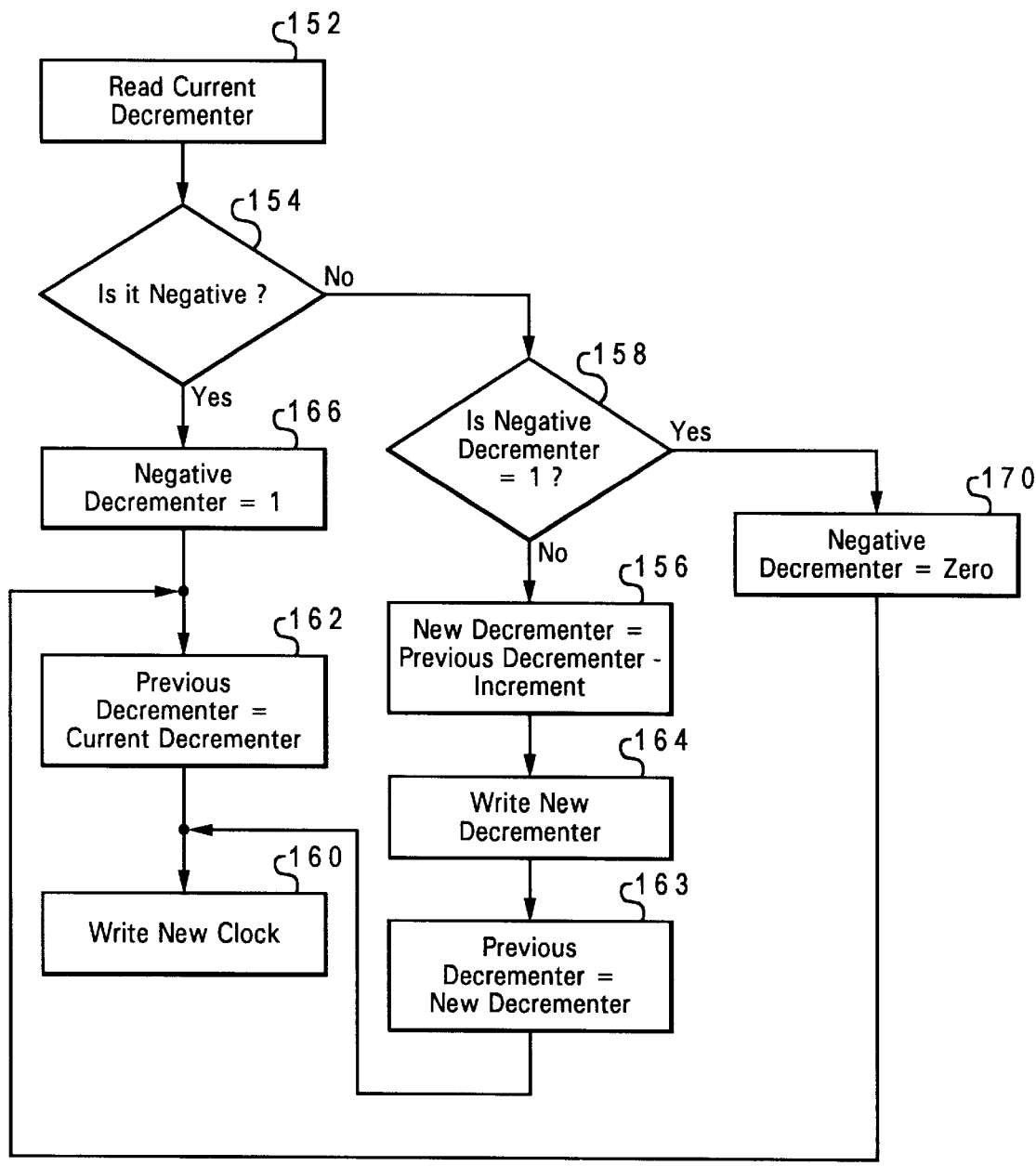
FIG. 7 is a detailed flow diagram depicting the step of compensating the clock and try to compensate the decrementer in FIG. 3.

Referring now to FIG. 7, there is shown a detailed flow diagram depicting the step of compensating the clock and compensating the decrementer when necessary in step 130 of FIG. 3. Referring to FIG. 7, the current decrementer value is read from the decrementer 34 in step 152 and a determination is made if it is a negative value in step 154. The decrementer continues to decline regardless of the clock value. A negative decrementer indicates that a clock interrupt has already been posted and there is no need to compensate the decrementer until it has been reloaded with a positive value by the operating system's clock interrupt handling code. If the decrementer is negative, the negative decrementer value is set equal to one, and the new clock value calculated in FIG. 3 is now written to the processor clock 30 of processing unit 12a, as shown in steps 160 and 166. The previous decrementer value is then set equal to the current decrementer value for use the next time the tracing code is being executed, as shown in step 162. At this point in the process, compensation has been completed for this execution of the tracing code and the method therefore finishes and ends at step 112 in FIG. 3 until the next time the tracing code is being executed. If, in step 154, the current decrementer is not negative, the negative decrementer value is checked in step 158 to see if it is equal to one. If the negative decrementer value is equal to one, its value is set equal to zero in step 170 and the process continues to step 162. If the negative decrementer value is not equal to one in step 158, then a new decrementer value is set equal to the previous decrementer value minus the increment calculated in FIG. 6. This new decrementer value is now written to the decrementer 34 in processing unit 12a, as shown in step 164. The previous decrementer value is now set to the new decrementer value and the new clock value calculated in FIG. 3 is now written to the processor clock 30 of processing unit 12a. Compensation has again been completed for this execution of the tracing code and the method therefore finishes and ends at step 112 in FIG. 3 until the next execution of the tracing code.

Figure 5:
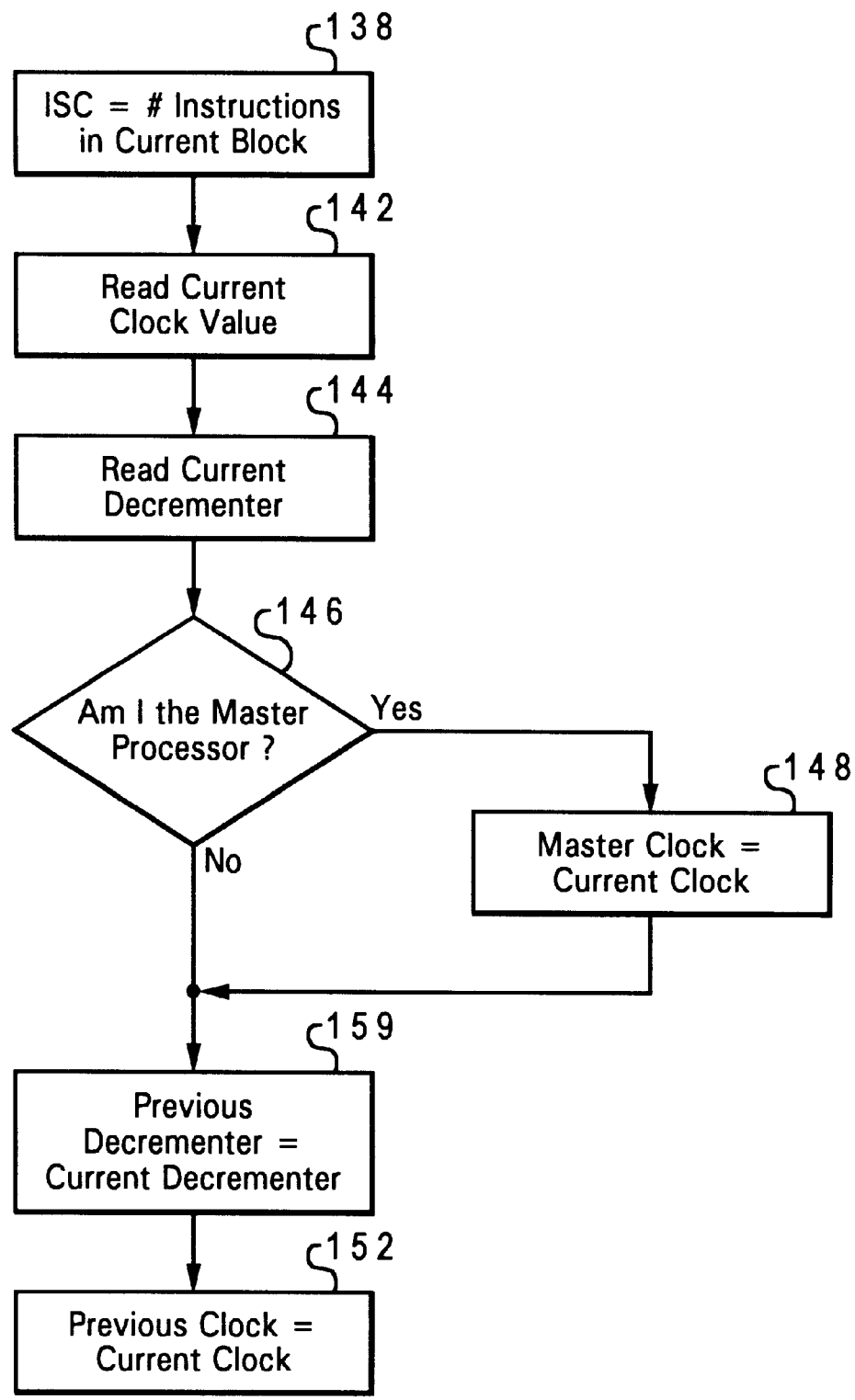
FIG. 5 is a detailed flow diagram depicting the step when clock compensation is not performed in FIG. 3.

Referring now to FIG. 5, there is shown a detailed flow diagram depicting step 110 in FIG. 3 when clock compensation is not performed after the execution of the tracing code. Referring to FIG. 5, the ISC value is set to the number of instructions in the current basic block in step 138. The current clock and current decrementer values are read respectively from the processor clock 30 and the decrementer 34 in steps 142 and 144. The processing unit 12a is then checked in step 146 to see if it is designated as being the master processor. If processing unit 12a is the master processor, then the value assigned to the master clock value in software is set equal to the current clock value of step 142 and the process proceeds to step 159. If the processing unit 12a has not been designated as the master processor, then the process proceeds directly to step 159. As shown in FIG. 5, in step 159 the previous decrementer value is set to the current decrementer value and the previous clock value is set to the current clock value. Therefore, the next time the tracing code is being called, the current values for the clock and decrementer become stored as the previous clock and decrementer values for use with the method of the present invention. At this point in the process no compensation was necessary after the execution of the tracing code and the method therefore finishes and ends at step 112 in FIG. 3 until the next time the tracing code is being called. These calculations cover the cases for which no clock compensation is used. The relative infrequency of these cases means that they have negligible effect on clock compensation. The previous clock value is simply reset to the current value of the clock.

It therefore should be appreciated that the advantage of using the present invention versus prior art compensation techniques is in that all the processor clocks in a symmetrical multi-processing system may be compensated. The method described allows one processor to fully compensate its clock and decrementer independently while all the other processor's to compensate only their decrementers independently and simply follow a defined "Master" processor clock value. The method and system of the present invention provides a simple and flexible mechanism which is performed each time the code used to take the trace is executed by slowing down the clock proportionally to the density of the trace.

It is also important to note that although the present invention has been described in the context of a fully functional clock compensation technique for symmetrical multi-processing systems when performing instruction level tracing, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for clock compensation during instruction level tracing in a data processing system having more than one processor clock, said method comprising the steps of:

reading current clock values for a selected processor clock and associated decrementer for a current call to a tracing code applied to a basic block of code in a data processing system;

compensating said selected processor clock by a compensation increment based on a trigger value and a previous clock value of a previous call to a tracing code.

2. The method for clock compensation according to claim 1, further comprising the steps of:

determining if said previous clock value for said previous call to a tracing code is greater than said current clock value for said selected processor clock; and responsive to said determination, not compensating said processor clock when said selected processor clock is greater.

3. The method for clock compensation according to claim 2, further comprising the steps of:

determining if said selected previous clock value for said previous call to said tracing code is less than said current clock value for said selected processor clock;

responsive to said determination, calculating a delta value by subtracting said previous clock value from said current clock value for said selected processor clock when said selected processor clock value is less than said selected previous clock value;

determining if said delta value is greater than a max delta value where max delta value is defined as maximum delta clock ticks between executions of tracing code, and responsive to said determination, not compensating said selected processor clock when said delta value is greater.

4. The method for clock compensation according to claim 3, further comprising the steps of:

determining if said delta value is equal or less than said max delta value, further determining if said current clock value is greater than a near overflow value; and responsive to said determination, not compensating said selected processor clock when said delta value is greater.

5. The method for clock compensation according to claim 4, further comprising the steps of:

assigning said current clock value for said selected processor clock as a master clock when it is safe to compensate.

6. The method for clock compensation according to claim 5, further comprising the steps of:

setting an instruction since compensation value equal to a number of instructions in a current block; and assigning said current clock and associated current decrementer values as said previous clock and previous decrementer values when compensation is not performed for use in compensating a selected processor clock when a next call to a tracing code occurs.

7. The method for clock compensation according to claim 1, further comprising the steps of:

setting said compensation increment equal to a compensation step times a number of instructions in said basic block of code when said trigger value is equal to one.

8. The method for clock compensation according to claim 7, further comprising the steps of:

setting an instruction since compensation value equal to a number of instructions since a last time said trigger value was reached and said selected processor clock was compensated when said trigger value is greater than one; and determining if said instruction since compensation value is less than said trigger value, responsive to said determination setting said instruction since compensation value equal to said instruction since compensation value plus said number of instructions in said basic block of code and setting said compensation increment equal to zero.

9. The method for clock compensation according to claim 8, further comprising the steps of:

determining if said instruction since compensation value is greater or equal than said trigger value, responsive to said determination setting said instruction since compensation value equal to a remainder of an integer division of said instruction since compensation value by said trigger value and setting said compensation increment as an integer division of said instruction since compensation value by said trigger value.

10. The method for clock compensation according to claim 9, further comprising the steps of:

setting a new clock value equal to said previous clock value plus said compensation increment and setting said master clock and said previous clock value to said new clock value when said current clock value for said selected processor has been assigned as said master processor.

11. The method for clock compensation according to claim 9, further comprising the steps of:

setting a new clock value equal to said master clock and said previous clock value to said new clock value when another selected processor has already been assigned as said master processor.

12. The method for clock compensation according to claim 11, further comprising the steps of:

determining if said decrementer value is negative, responsive to said determination setting said previous decrementer value equal to said current decrementer value and setting said negative decrementer equal to one and writing said new clock value to said selected processor clock when said decrementer value is negative.

13. The method for clock compensation according to claim 12, further comprising the steps of:
  determining if said decrementer value is positive, further determining if said negative decrementer value is equal to one;
  responsive to said determination setting said previous decrementer value equal to said current decrementer value and setting said negative decrementer equal to zero and writing said new clock value to said selected processor clock when said negative decrementer value is equal to one.

14. The method for clock compensation according to claim 13, further comprising the steps of:
  determining if said decrementer value is positive, further determining if said negative decrementer value is not equal to one;
  responsive to said determination setting a new decrementer value equal to said previous decrementer value minus said compensation increment and writing said new decrementer value to said decrementer for said selected processor clock, and
  setting said previous decrementer value equal to said new decrementer value and writing said new clock value to said selected processor clock when said negative decrementer value is not equal to one.

15. An information handling system for clock compensation during instruction level tracing in a data processing system having more than one processor clock, comprising:
  means for reading current clock values for a selected processor clock and associated decrementer for a current call to a tracing code applied to a basic block of code in a data processing system;
  means for compensating said selected processor clock by a compensation increment based on a trigger value and a previous clock value of a previous call to a tracing code.

16. The information handling system for clock compensation according to claim 15, further comprising:
  means for determining if said previous clock value for said previous call to a tracing code is greater than said current clock value for said selected processor clock; and
  responsive to said means for determination, not compensating said processor clock when said selected processor clock is greater.

17. The information handling system for clock compensation according to claim 16, further comprising:
  means for determining if said selected previous clock value for said previous call to a tracing code is less than said current clock value for said selected processor clock;
  means for calculating a delta value by subtracting said previous clock value from said current clock value for said selected processor clock when said selected processor clock value is less than said selected previous clock value;
  means for determining if said delta value is greater than a max delta value where max delta value is defined as maximum delta clock ticks between calls to a tracing code, and
  responsive to said means for determination, not compensating said selected processor clock when said delta value is greater.

18. The information handling system for clock compensation according to claim 17, further comprising:
  means for determining if said delta value is equal or less than said max delta value, further determining if said current clock value is greater than a near overflow value; and
  responsive to said means for determination, not compensating said selected processor clock when said delta value is greater.

19. The information handling system for clock compensation according to claim 18, further comprising:
  means for assigning said current clock value for said selected processor clock as a master clock when it is safe to compensate and upon a first occurrence of a call to a tracing code.

20. The information handling system for clock compensation according to claim 19, further comprising:
  means for setting an instruction since compensation value equal to a number of instructions in a current block; and
  means for assigning said current clock and associated current decrementer values as said previous clock and previous decrementer values when compensation is not performed for use in next instruction level trace occurs.compensating a selected processor clock when a next call to a tracing code occurs.

21. The information handling system for clock compensation according to claim 15, further comprising:
  means for setting said compensation increment equal to a compensation step times a number of instructions in said basic block of code when said trigger value is equal to one.

22. The information handling system for clock compensation according to claim 21, further comprising:
  means for setting an instruction since compensation value equal to a number of instructions since a last time said trigger value was reached and said selected processor clock was compensated when said trigger value is greater than one; and
  means for determining if said instruction since compensation value is less than said trigger value, responsive to said means for determination setting said instruction since compensation value equal to said instruction since compensation value plus said number of instructions in said basic block of code and setting said compensation increment equal to zero.

23. The information handling system for clock compensation according to claim 22, further comprising:
  means for determining if said instruction since compensation value is greater or equal than said trigger value, responsive to said means for determination means for setting said instruction since compensation value equal to a remainder of an integer division of said instruction since compensation value by said trigger value and means for setting said compensation increment as an integer division of said instruction since compensation value by said trigger value.

24. The information handling system for clock compensation according to claim 23, further comprising:
  means for setting a new clock value equal to said previous clock value plus said compensation increment and means for setting said master clock and said previous clock value to said new clock value when said current clock value for said selected processor has been assigned as said master processor.

25. The information handling system for clock compensation according to claim 24, further comprising:
  means for setting a new clock value equal to said master clock and said previous clock value to said new clock value when another selected processor has already been assigned as said master processor.

26. The information handling system for clock compensation according to claim 25, further comprising:

means for determining if said decrementer value is negative, responsive to said means for determination means for setting said previous decrementer value equal to said current decrementer value and means for setting said negative decrementer value equal to one and means for writing said new clock value to said selected processor clock when said decrementer value is negative.

27. The information handling system for clock compensation according to claim 26, further comprising:

means for determining if said decrementer value is positive, further means for determining if said negative decrementer value is equal to one;

means for setting said decrementer value equal to said current decrementer value and means for setting said negative decrementer value equal to zero and means for writing said new clock value to said selected processor clock when said negative decrementer value is equal to one.

28. The information handling system for clock compensation according to claim 27, further comprising:

means for determining if said decrementer value is positive, further means for determining if said negative decrementer value is not equal to one;

means for setting a new decrementer value equal to said previous decrementer value minus said compensation increment and means for writing said new decrementer value to said decrementer for said selected processor clock, and means for setting said previous decrementer value equal to said new decrementer value and means for writing said new clock value to said selected processor clock when said negative decrementer value is not equal to one.

29. A computer product residing on a computer usable medium for clock compensation during instruction level tracing in a data processing system having more than one processor clock, comprising:

instruction means for reading current clock values for a selected processor clock and associated decrementer for a current call to a tracing code applied to a basic block of code in a data processing system;

instruction means for compensating said selected processor clock by a compensation increment based on a trigger value and a previous clock value of a previous call to a tracing code.

* * * * *